United States Patent [19]

Sasaki

[11] Patent Number: 5,452,179
[45] Date of Patent: Sep. 19, 1995

[54] PORTABLE ELECTRONIC APPARATUS HAVING TWO DISK DRIVES MOUNTED ON A SINGLE FIXING MEMBER

[75] Inventor: Katumaru Sasaki, Tokyo, Japan

[73] Assignee: Kabushiki Kaisha Toshiba, Kanagawa, Japan

[21] Appl. No.: 162,804

[22] Filed: Dec. 7, 1993

Related U.S. Application Data

[60] Continuation of Ser. No. 103,326, Aug. 9, 1993, abandoned, which is a continuation of Ser. No. 874,110, Apr. 27, 1992, abandoned, which is a division of Ser. No. 598,519, Oct. 17, 1990, abandoned.

[30] Foreign Application Priority Data

Oct. 20, 1989 [JP] Japan ................... 1-271722

[51] Int. Cl.⁶ .......................... H05K 7/14; G06F 1/16
[52] U.S. Cl. .................................................. 361/685
[58] Field of Search ............... 364/708.1; 360/97.01, 360/137; 361/679–686, 735, 825, 829

[56] References Cited

U.S. PATENT DOCUMENTS

| | | | |
|---|---|---|---|
| 4,566,054 | 1/1986 | Shimoda et al. | 361/428 X |
| 4,852,033 | 7/1989 | Saitou | 364/708 |
| 4,864,523 | 9/1989 | Sasaki . | |
| 5,136,466 | 8/1992 | Remis et al. | 361/391 |

OTHER PUBLICATIONS

IBM Technical Disclosure Bulletin, "Grounded File--Mounting Plate", vol. 29, No. 12, May 1987, pp. 5292–5293.
IBM Technical Disclosure Bulletin, vol. 28, No. 6, Nov. 1985, pp. 2514–2515, "Universal, Low–Cost Hard–File Mounting Assembly".
IBM Technical Disclosure Bulletin, vol. 30, No. 1, Jun. 1987, pp. 328 & 329, "Diskette Drive Mounting Racket Utilizing An A–Frame Structure".
T1100 Plus Personal Computer Maintenance Manual, Toshiba Corporation, May 30, 1986, pp. 1-1, 1-2, 1-5, 5-1, 5-9, 5-10, 5-11.
T1200 Personal Computer Maintenance Manual, Toshiba Corporation, May 1987, pp. 4-12, 4-13, 4-14, 4-16, 4-17.

*Primary Examiner*—Leo P. Picard
*Assistant Examiner*—Michael W. Phillips
*Attorney, Agent, or Firm*—Finnegan, Henderson, Farabow, Garrett & Dunner

[57] ABSTRACT

A portable electronic apparatus includes a base having a first drive mounting portion. A drive fixing member having a second mounting portion, including a raised planar surface, is mounted on the first drive mounting portion with just screws. The drive fixing member covers the first disk drive. Second screws fix the first disk drive within the drive fixing member. A second disk drive is mounted on the second drive mounting portion. A third screw fixes the second disk drive on the second drive mounting portion. A disk drive mounting space is compact because the first and the second disk drives are fixed on the same drive fixing member. Additional details relate to a handle assembly, a tilt-leg base for a keyboard, keyboard keys, two covers, and an expansion card mounting device.

17 Claims, 13 Drawing Sheets

PORTABLE ELECTRONIC APPARATUS HAVING TWO DISK DRIVES MOUNTED ON A SINGLE FIXING MEMBER

This application is a continuation of application Ser. No. 08/103,326 filed Aug. 9, 1993, abandoned, which is a continuation of Ser. No. 07/874,110 filed Apr. 27, 1992, abandoned, which is a divisional of Ser. No. 07/598,519 filed Oct. 17, 1990, now abandoned,

BACKGROUND OF THE INVENTION

1. Field of the Invention

This invention relates to a portable electronic apparatus, such as a laptop computer or a portable word processor.

2. Description of the Related Art

A portable computer disclosed in U.S. Pat. Nos. 4,864,523, 4,895,231, 4,901,261 or 4,951,241 has a base unit and a display unit pivotally connected to the base unit. The base unit has a keyboard. The display unit is able to rotate between a closed position where the display unit covers the keyboard and an open position where the keyboard is exposed and is able to be operated.

The portable computer has a U-shaped handle assembly. The handle assembly has a pair of legs slidably connected to the computer and a handle interconnecting with the legs. The handle assembly is able to slide between a stored position where the handle contacts the computer and the projected position where the handle is gripped by an operator. The computer has a pair of leg storing portion. The legs are almost wholly stored in the leg storing positions in the stored position, respectively. The computer which has a U-shaped handle assembly is big because the computer has two leg storing portions.

The computer has a floppy disk drive (FDD) and a hard disk drive (HDD). The FDD and HDD are disposed on a same inner surface in the computer, respectively. Consequently a width of the computer is not able to be smaller than a sum of widths of the FDD and HDD.

The computer has a tilt assembly which is slidably moved between a tilting position where the keyboard is tilted forwardly and a untilting position where the keyboard is not tilted. The tilt assembly is big because the tilt assembly is rotated between the tilting position and the untilting position.

The display unit has an outer case and an inner case. The outer case is coupled to the inner case by a screw. The screw is covered by a flexible resin cover. The resin cover is removably fixed to the display unit. But the resin cover is hard to remove from the display unit because the engagement of the resin cover and the display unit is tough.

The keyboard of the computer has character keys and function keys. The character keys and function keys are separated by partition wall. When the computer is small, the partition wall is thin. When the partition wall is thin, the wall bends. If the wall is bends, the wall contacts the keys and an ability of an operation of the keys is worse.

The computer has an expansion card storing portion. After an expansion card is installed in the portion, a resin cover covers the portion. But the cover Is not electrically connected to the card. Consequently the expansion card generates an electromagnetic wave.

SUMMARY OF THE INVENTION

It is a first object of the present invention to provide a portable electronic apparatus having a small leg storing portion of a handle assembly.

It Is a second object of the present invention to provide a portable electronic apparatus including a base unit having a floppy disk drive and a hard disk drive which is arranged on the floppy disk drive.

It is a third object of the present invention to provide a portable electronic apparatus having a small tilt assembly which is not rotated.

It is a fourth object of the present invention to provide a portable electronic apparatus having a flexible screw cover which is easy to remove from the computer and toughly engages the cover and the computer.

It is a fifth object of the present invention to provide a portable electronic apparatus including a keyboard having character keys and function keys and a thin partition which is prevented bending.

It is a sixth object of the present invention to provide a portable electronic apparatus having an expansion card storing portion and a cover which prevents generating a electromagnetic wave of an expansion card.

In order to achieve the first object, a portable electronic apparatus of the present invention comprises a base unit including a handle storing portion and a leg storing portion, T-shaped handle assembly including a leg which is stored in the leg storing portion and connected to the base unit and has a longitudinal axis and handle connecting portion and a handle which is stored in the handle storing portion and is slidably connected to the handle connecting portion. The handle is able to slide in a direction of the longitudinal axis and rotate between a stored position where the handle and the leg are stored in the handle storing portion and the leg storing portion, respectively, and a projected position where handle is gripped by an operator. According to the apparatus of the present invention, the handle assembly is stored in a compact space because the handle is able to slide in the direction of the longitudinal axis.

In order to achieve the second object, a portable electronic apparatus of the present invention comprises a base unit which has a first mounting portion, a first disk drive which is mounted on the first mounting portion, a drive housing which has a second mounting portion, a second disk drive which is fixed on the first mounting portion, a first screw which fixes the first disk drive and the drive housing on the first mounting portion and a second screw which fixes the second disk drive on the second mounting portion. According to the portable electronic apparatus of the present invention, a width of the apparatus is not affected by widths of the first and the second disk drives.

In order to achieve the third object, a portable electronic apparatus of the present invention comprises a base unit having a tilt leg storing portion and a keyboard, a tilt leg which is slidably connected to the base unit between a tilting position where keyboard is tilted forwardly and a storing position where the tilt leg is stored in the tilt leg storing portion, a flexible board which is engaged the leg in the tilting position and the storing position and a switch releasing the engagement of the leg and the board. According to the apparatus of the present invention, the leg storing portion of the base unit is compact because the leg is not rotate.

In order to achieve the fourth object, a portable electronic apparatus of the present invention comprises a display unit including an outer case having a screw engaging portion and an inner case which has a cover storing portion having a cover storing surface having a through hole for screw and a cover engaging hole and a cover which has a thick portion and a thin portion having a claw which is engaged with the cover engaging hole. An inner surface of the thin portion is not contact with the storing surface. When the thin portion is pushed by an operator, the thin portion is bent. When the thin portion is bent, the claw which is engaged with the cover engaging hole is released from the cover engaging hole.

In order to achieve the fifth object, a portable electronic apparatus of the present invention comprises a base unit including a keyboard which has a character keys, function keys and a engaging hole and a front top cover which has a partition wall which has a engaging claw engaged with the engaging hole. When the front top cover is mounted on the keyboard, the engaging claw is engaged with the engaging hole and the partition wall is not bent.

In order to achieve the sixth object, a portable electronic apparatus of the present invention comprises a base unit including a card storing portion having a first connector which is electrically connecting an expansion card and a first inner surface, a cover which covers the card storing portion and has a second inner surface having a spring. The spring pushes and fixes the expansion card in a direction of the first inner surface and electrically connects the expansion card and the cover.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiments given below, serve to explain the principle of the invention.

FIGS. 6A–8C are sectional views taken along line VI—VI of FIG. 5 for explaining a movement of the handle assembly;

FIG. 7 is an exploded perspective view of a tilt leg assembly;

FIGS. 8A–8C are sectional views taken along line VIII—VIII of FIG. 5 for explaining a movement of the tilt leg assembly;

DETAILED DESCRIPTION OF THE PREFERRED EMBODIMENTS

Figure 1:
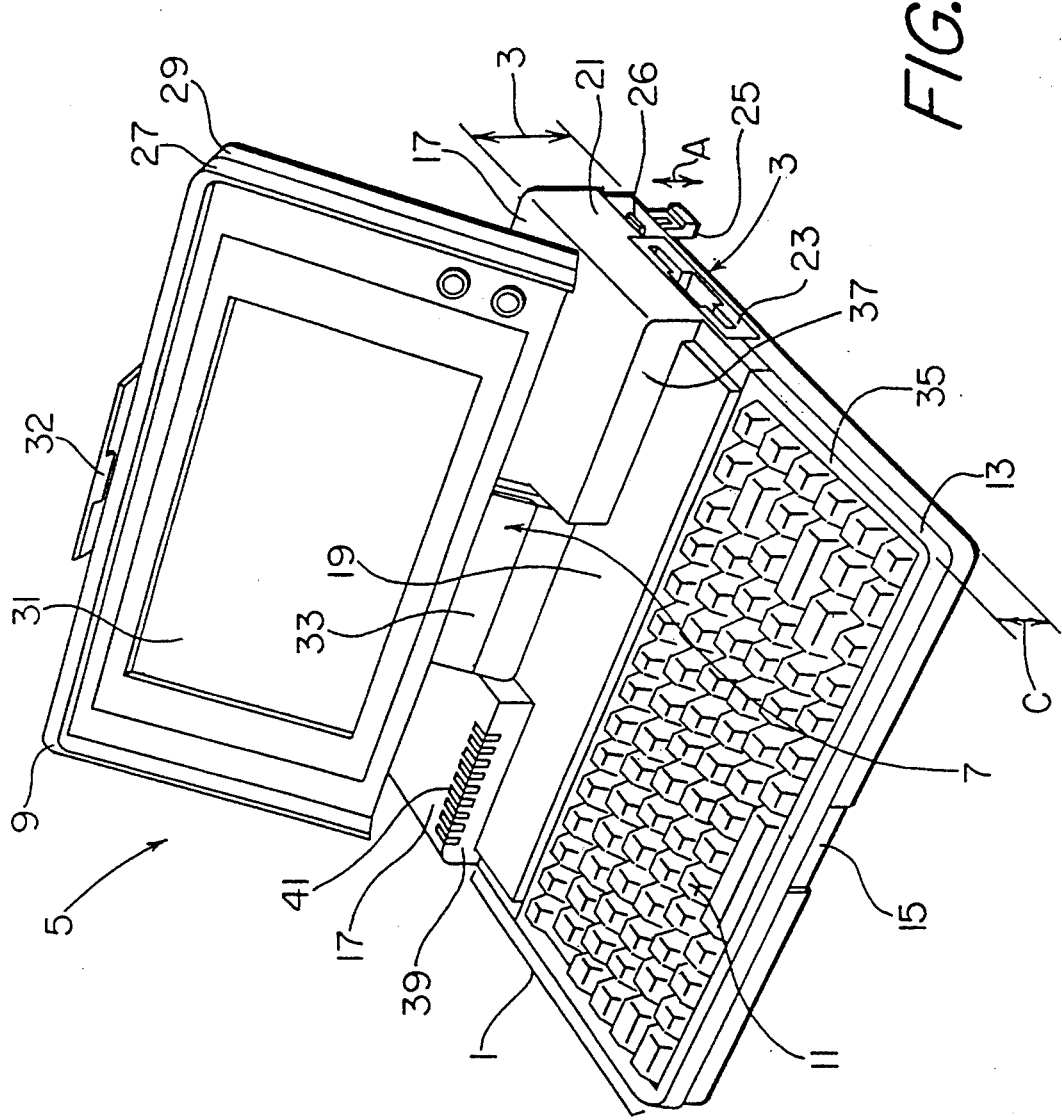
FIG. 1 is a perspective view of a laptop computer according to an embodiment of the present invention.

FIG. 1 is a perspective view of a laptop computer.

A laptop computer 5 has a base unit 3 and a display unit 9. Base unit 3 has a front portion 1. A keyboard 11 and a front top cover 13 are fixed on the front portion 1. A handle assembly 15 is pivotally connected to a front end of the base unit 3. Base unit 3 has a rear top surface 17 and a display leg mounting surface 19. A side wall 21 of base unit 3 has a floppy disk drive (FDD) 23 and a tilt leg release switch 26. A rear portion of a bottom surface of base unit 3 has a tilt leg 25. Tilt leg 25 is slidable in a direction of an arrow A. Base unit 3 has a right center wall 37 and a left center wall 39. Light electroluminescence devices (LEDs) 41 are mounted in a corner between left center wall 39 and rear top surface 17. Display unit 9 has a display leg 7. Display leg 7 is mounted on mounting surface 19. Display unit 9 is pivotally connected to base 3 by display leg 7. Display unit 9 has an inner case 27, an outer case 29, display surface 31, a display latch claw 32 and a screw cover 33. Screw cover 33 is removably fixed on display leg 7. A height B between rear top surface 17 and the bottom surface of base unit 3 is higher than a height C between a front top surface 35 and the bottom surface.

Figure 2:
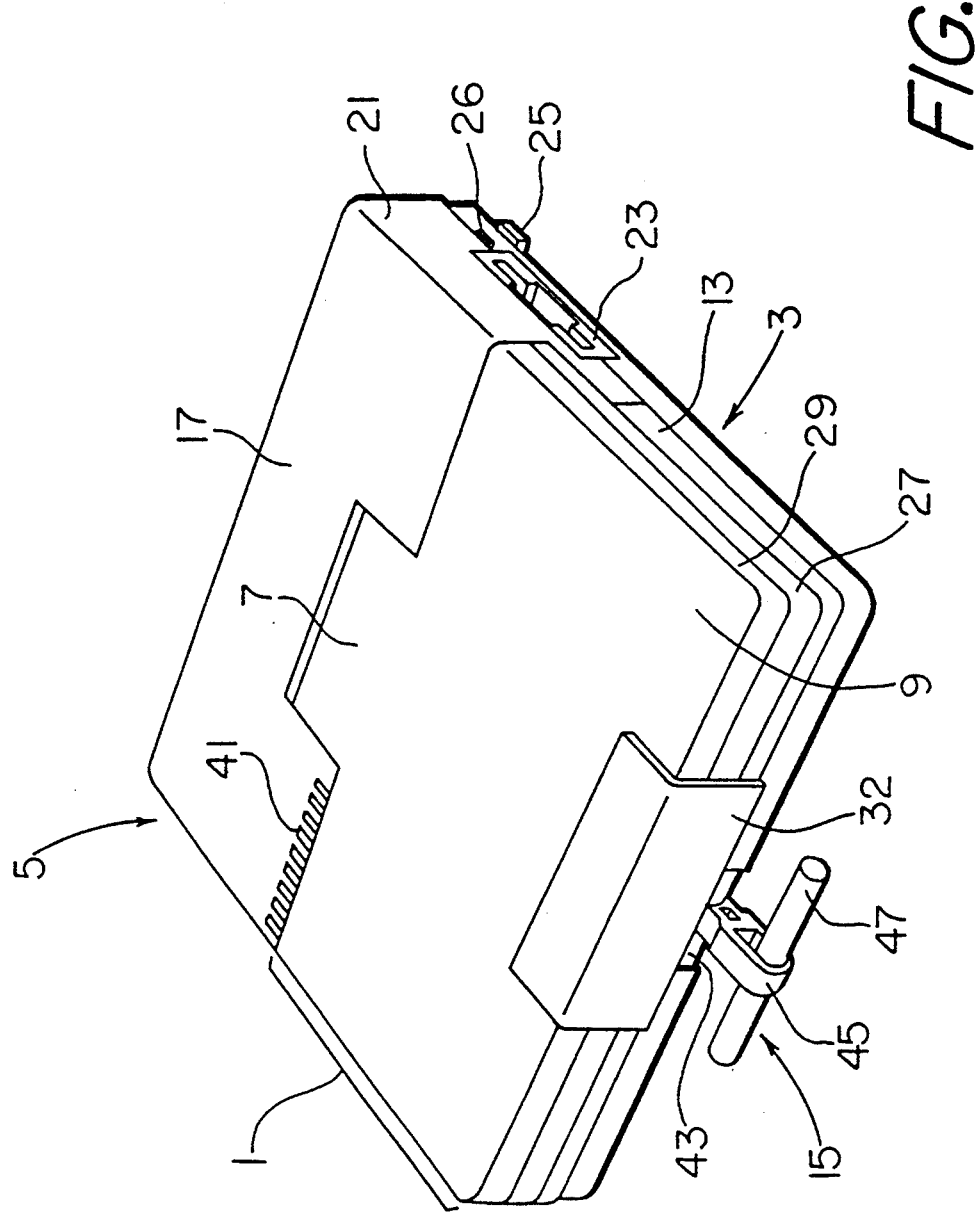
FIG. 2 is a perspective view of the laptop computer when a display unit is set in a closed position. A handle assembly is set in a projecting position and a tilt leg assembly is set in a stored position.

FIG. 2 is a perspective view of the laptop computer when the display unit 9 is set in a closed position, the handle assembly 15 is set in a projecting position and the tilt leg 25 is set in a stored position.

Display unit 9 rotates between an open position (shown in FIG. 1) for exposing and operating keyboard 11 and a closed position (shown in FIG. 2) for covering keyboard 11. When display unit 9 is set in the closed position, an outer surface of outer case 29 and rear top surface 17 are maintained at a common height level. Tilt leg 25 slides between a tilting position (shown in FIG. 1) for tilting keyboard 11 forwardly and an stored position (shown in FIG. 2) for untilting keyboard 11. Handle assembly 15 has a handle axis portion 43, a leg portion 45 which is fixed to handle axis portion 43 and handle portion 47 which is slidably connected to leg portion 45. Handle assembly rotates between a storing position (shown in FIG. 1) for storing handle assembly 15 and a projecting position (shown in FIG. 2) for gripping handle portion 47.

Figure 3:
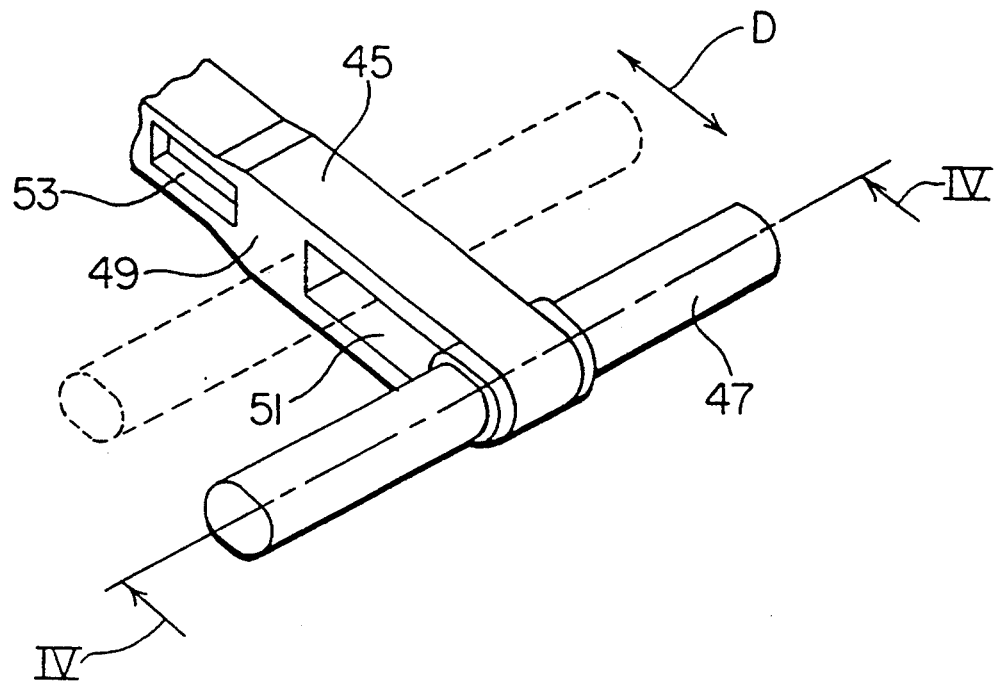
FIG. 3 is a perspective view for explaining a movement of a handle of the handle assembly.

FIG. 3 is a perspective view for explaining a movement of the handle assembly.

A side surface 49 of leg portion 45 has a rectangle hole 51 and an engaging groove 53. Handle portion 47 is slidably connected to rectangle hole 51. Handle portion slides between a handle gripping position (shown by a continuous line) and handle storing position (shown by a dotted line).

Figure 4:
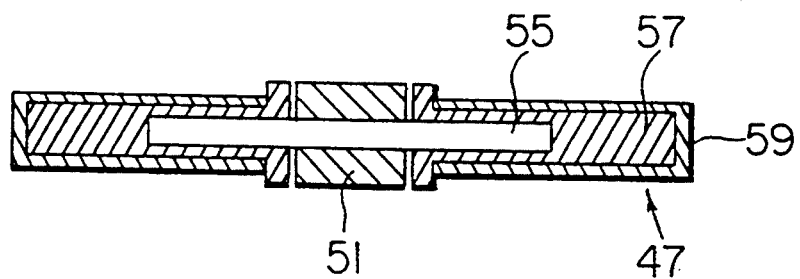
FIG. 4 is a sectional view taken along line W—W of FIG. 3.

FIG. 4 is a sectional view taken along line IV-IV of FIG. 3.

Handle portion 47 has a metal axis portion 55, a resin portion 57 for connecting metal axis portion in rectangle hole and a rubber portion 57 covering resin portion 57.

Figure 5:
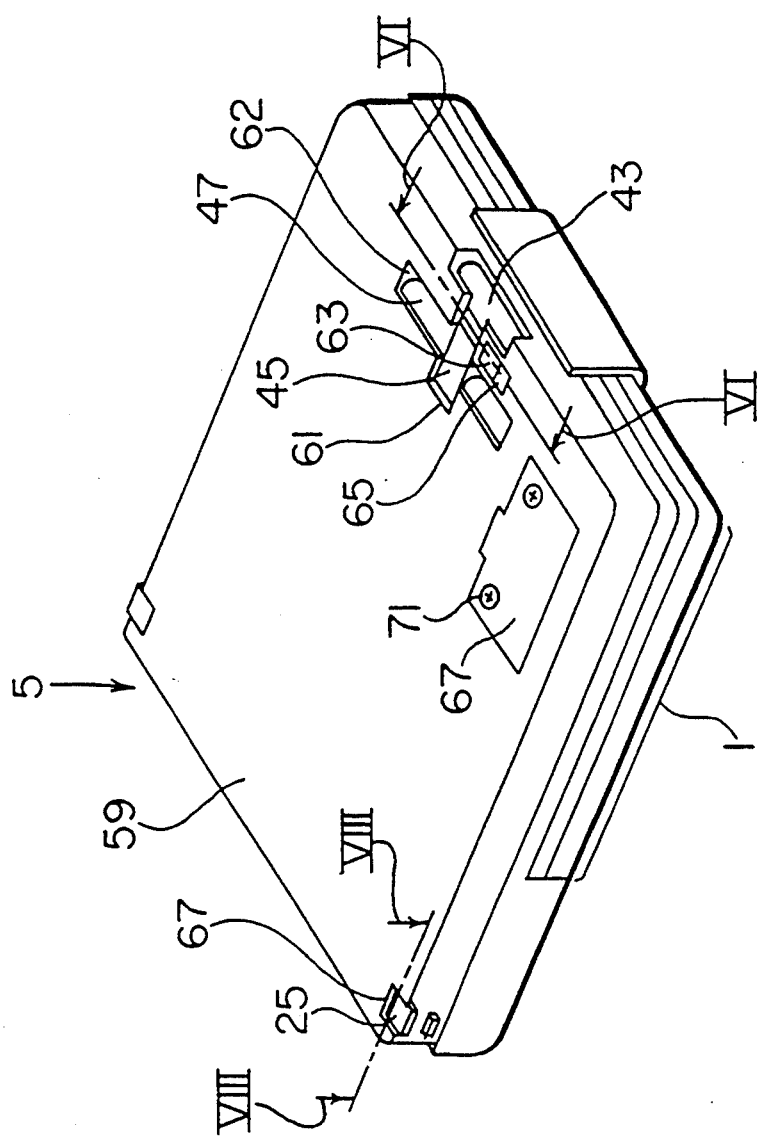
FIG. 5 is a perspective bottom view of FIG. 2.

FIG. 5 is a perspective bottom view of FIG. 2.

A bottom surface 59 of base unit 3 has a leg storing groove 61 and a handle storing groove 82 in a front end. Handle portion 47 is stored in groove 82 in the handle storing position. In the front end, bottom surface 59 has a switch storing portion 65 and a release switch 83 stored in switch storing portion 65. A rear end of bottom surface 59 has a pair of tilt leg storing portions 67. A card storing portion cover 89 is fixed on bottom surface 59 by screw 71.

Figure 6A:
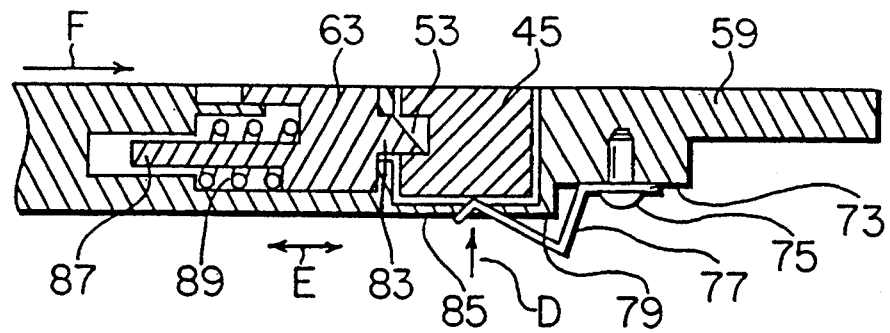
Figure 6B:
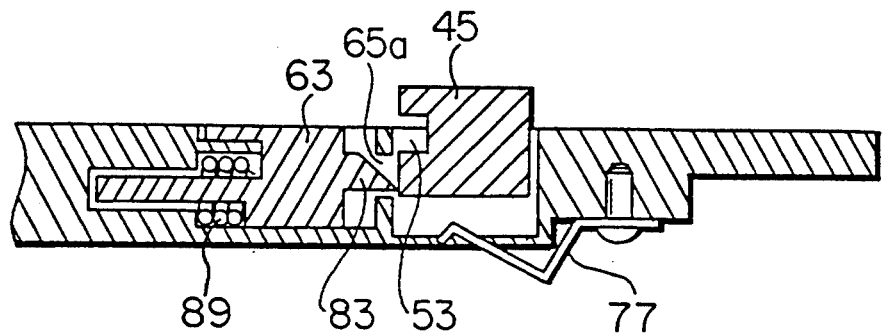
Figure 6C:
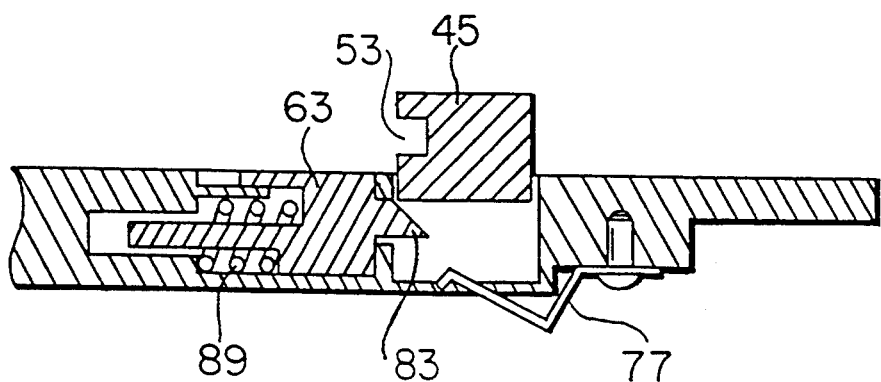

FIGS. 6A–6C are sectional views for explaining a movement of the handle assembly.

FIG. 6A is a sectional view taken along line VI—VI of FIG. 5. One end of a flat spring 77 is fixed on an inner surface 73 of base unit 3 by a screw 75. Inner surface 73 has an opening 79. The other end of flat spring 77 inserted In opening 79. The other end of spring 77 pushes leg portion 45 in a direction of an arrow D. Switch storing portion 65 has a side opening 65a. One end of release switch 63 has a latch claw 83. Latch claw 83 is inserted in side opening 65a. Latch claw 83 is engaged with engaging groove 53. Release switch 83 is slidable in a direction of an arrow E. The other end of release switch 63 has a spring holder 87. A coil spring 89 Is wound around spring holder 87. Coil spring 89 pushes release switch 63 in a direction of an arrow F. When an operator slides release switch 63, as shown in FIG. 6B, latch claw 83 is released from engaging groove 53. Coil spring 89 is contracted. When latch claw 83 is released, leg portion 45 projects from leg storing groove 61 by a force of flat spring 77. When the operator releases switch 63, as shown in FIG. 6C, release switch 63 returns to a position shown in FIG. 6A by a force of coil spring 89.

Figure 7:
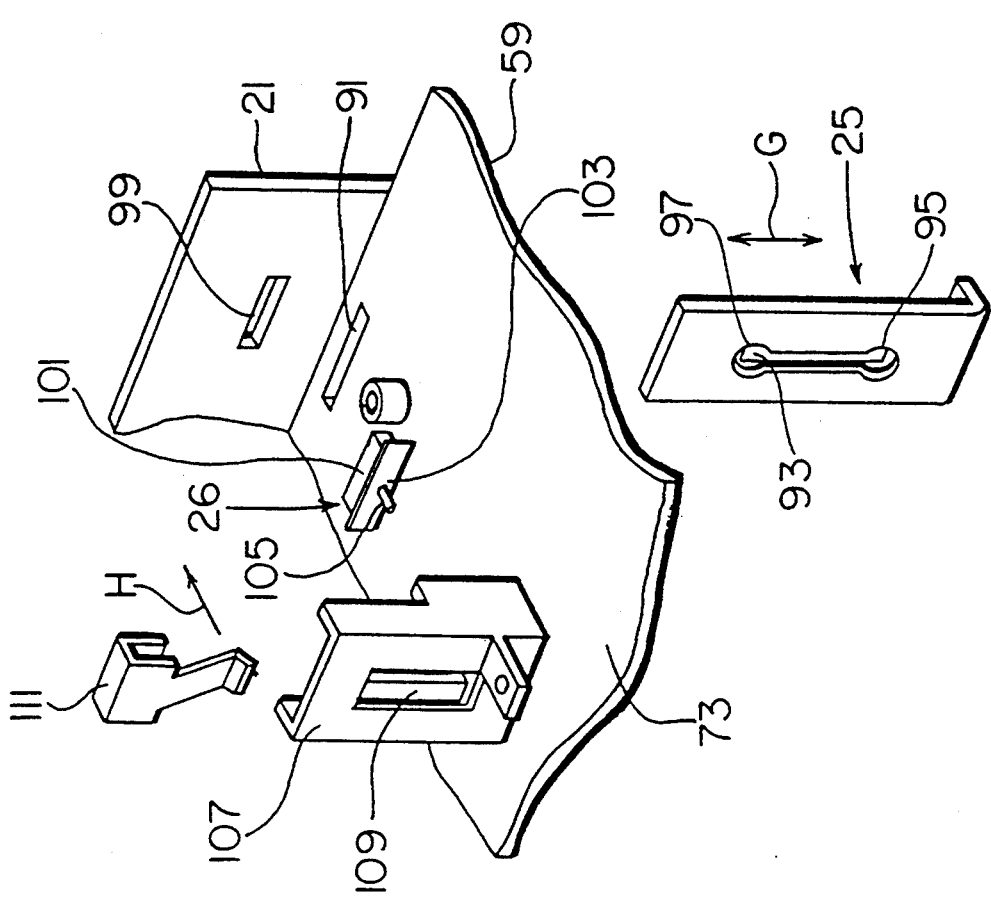

FIG. 7 is an exploded perspective view of tilt leg assembly.

Bottom surface 59 has a slit 91. Tilt leg 25 is inserted in slit 91. Tilt leg has a slit 93. One end of slit 93 has a first groove 95 for fixing tilt leg 25 in the stored position. The other end of slit 93 has a second groove 97 for fixing tilt leg 25 in the tilting position. Side wall 21 has a slit 99 for inserting release switch 26. Tilt leg release switch 26 has a head portion 101, a stopper portion 103 and a projecting portion 105. Head portion 101 is inserted in slit 99 and projected from side wall 21. Stopper portion 103 prevents release switch 26 falling out from slit 99. A leg holder 107 slidably supports tilt leg 25 in a direction of an arrow G. Leg holder 107 includes a elastic portion 109 having a engaging portion which is engaged in first and second grooves 95, 97. A flat spring 111 is fixed on leg holder 107. Flat spring 111 pushes the engaging portion in a direction of an arrow H. Leg holder 107 is fixed on inner surface 78 of base unit 3.

Figure 8C:
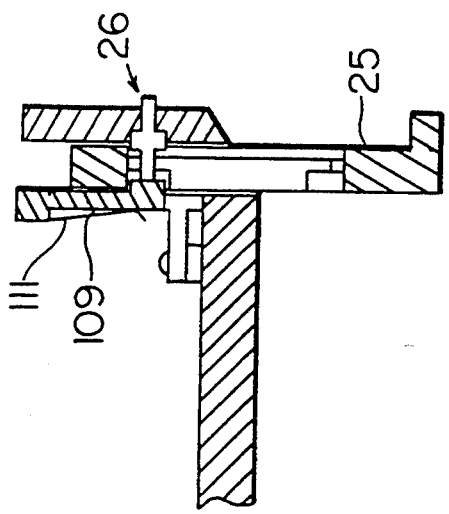
Figure 8B:
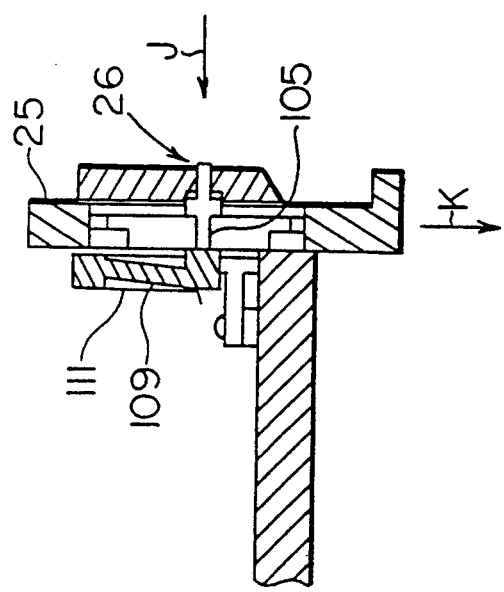
Figure 8A:
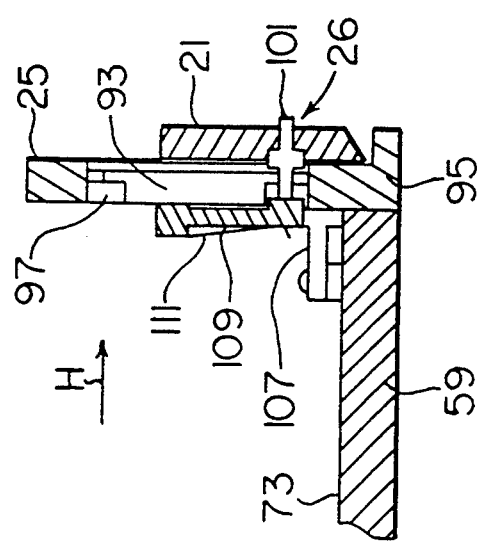

FIGS. 8A–8C are sectional views for explaining a movement of the tilt leg assembly.

FIG. 8A is a sectional view taken along line VIII-–VIII of FIG. 5. When tilt leg 25 is stored in the storing position, the engaging portion of elastic portion 109 is engaged with first groove 95. Tilt leg fixed in the storing portion because the engaging portion is pushed in a direction of an arrow H by flat spring 111. When an operator pushes head portion 101 of release switch 26 in a direction of an arrow J, as shown in FIG. 8B, projecting portion 105 pushes the engaging portion of elastic portion 109 and the engaging portion is released from first groove 95. When the engaging portion is released, tilt leg 25 is able to be slided in a direction of an arrow K. When the operator slides tilt leg 25 in the direction of the arrow K, the engaging portion of elastic portion 109 is inserted in and engaged with second groove 97 by spring 111.

Figure 9:
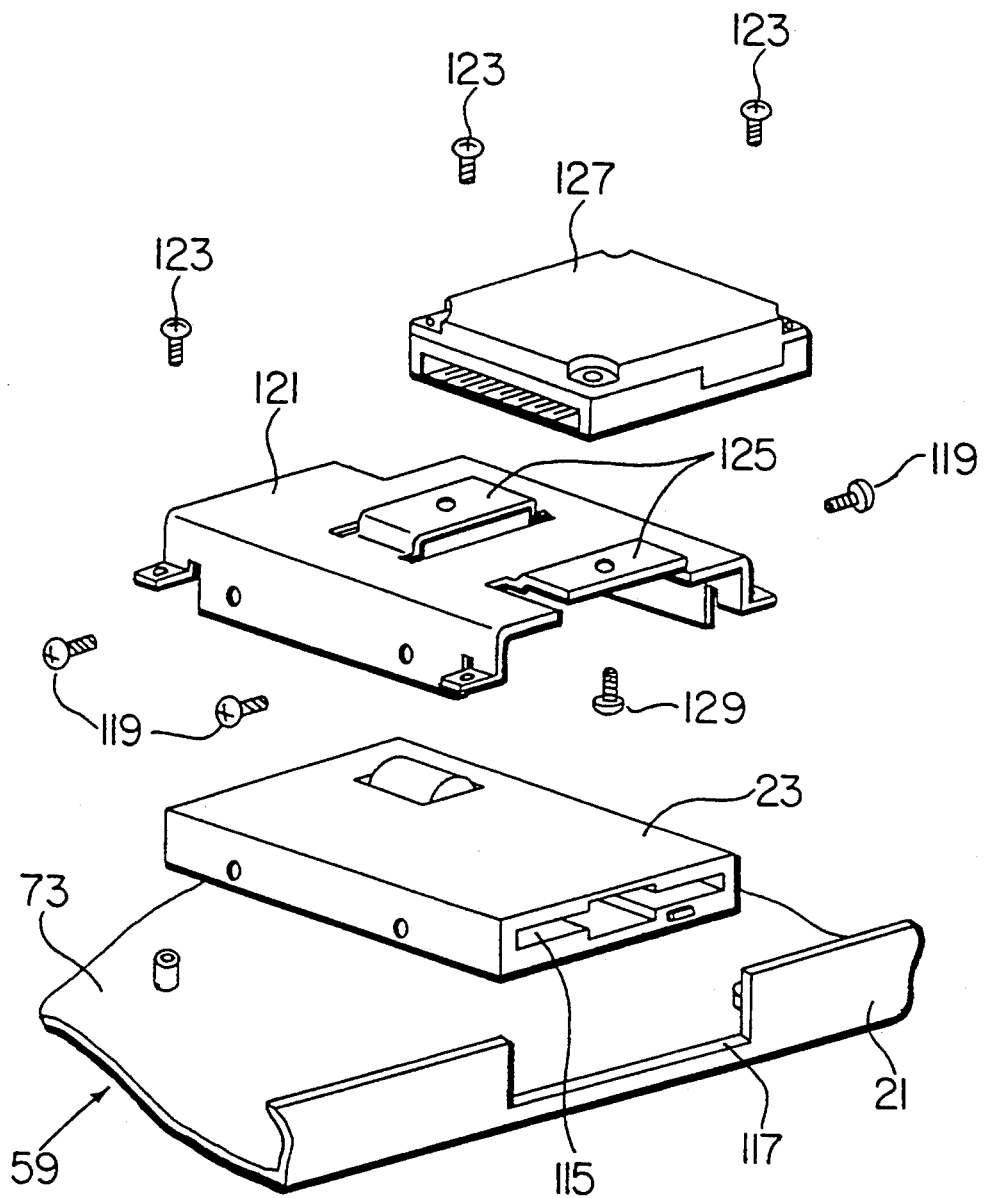
FIG. 9 is an exploded perspective view of a disk drive assembly.

FIG. 9 is an exploded perspective view of a disk assembly.

Side wall 21 of base unit 3 has a hole 117 for exposing a disk inserting portion 115 of 3.5 inches FDD 23. FDD 23 is fixed in drive housing 121 by screws 119. Drive housing 121 is fixed on inner surface 73 by screws 123. Drive housing 121 has a pair of hard disk mounting surfaces 125. A 2.5 inches hard disk drive (HDD) 127 is fixed on mounting surfaces 125 by screw 129. FDD 23 and HDD 127 is fixed on the same drive housing 121. Consequently a space of the disk assembly is compact.

Figure 10:
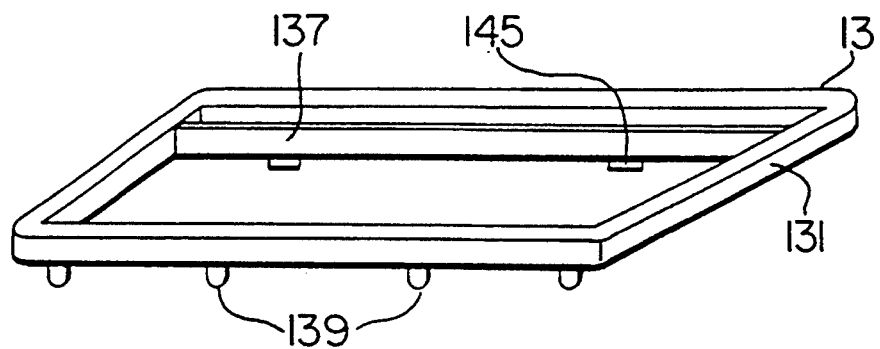
FIG. 10 is a perspective view of a front top cover.
Figure 11:
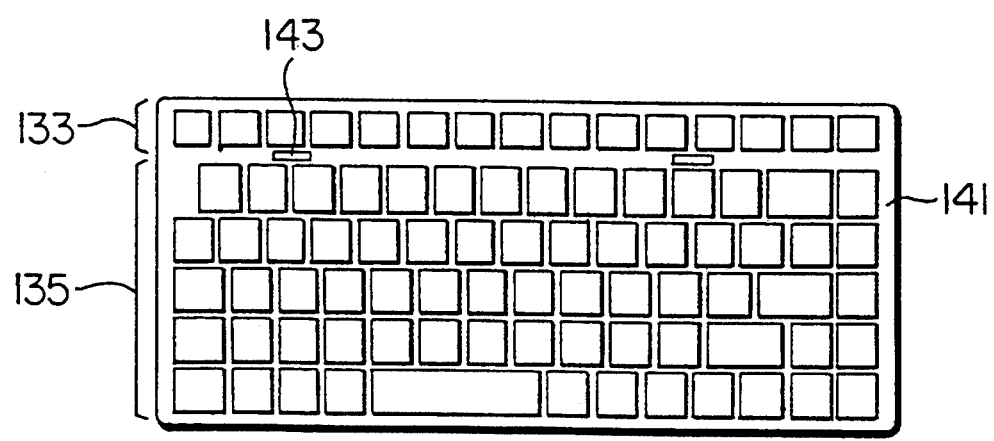
FIG. 11 is a top view of a keyboard.

FIG. 10 is a perspective view of a front top cover and FIG. 11 is a top view of a keyboard.

Front top cover 13 includes an outer frame 131 having screw engaging bosses 139 and an partition wall 137, for separating function keys 133 and character keys 135 of keyboard 11, having a pair of engaging claws 145. A plate 141 of keyboard 11 has a pair of engaging grooves 143. When keyboard 11 and front top cover 13 are assembled on base unit 3, engaging claws 145 are engaged with engaging grooves 143. Consequently, even though partition wall is thin, partition wall is prevented bending.

Figure 12:
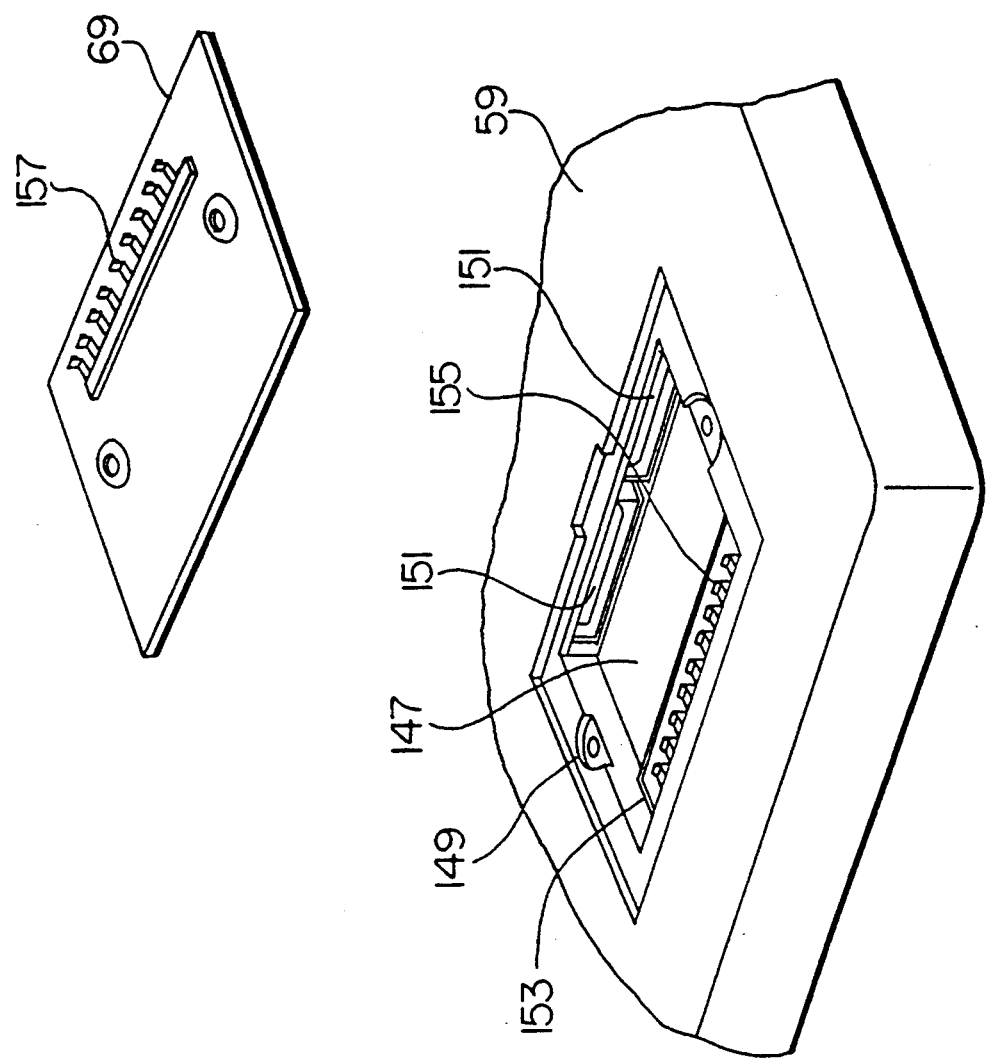
FIG. 12 is a perspective view of a card storing portion and a storing portion cover.
Figure 13:
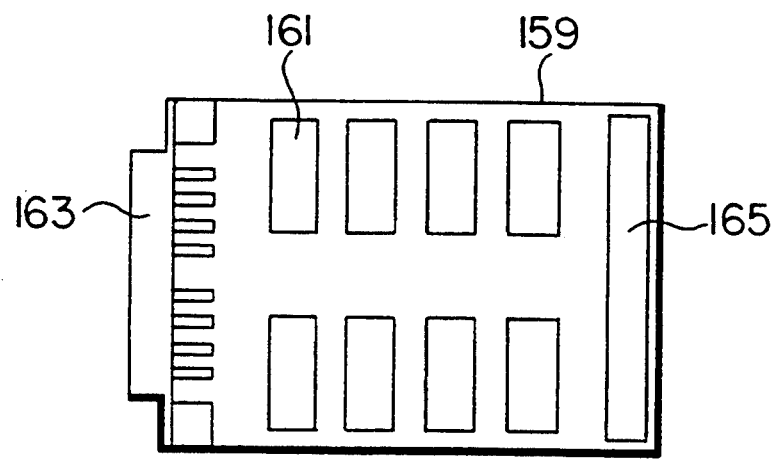
FIG. 13 is a top view of an expansion card.

FIG. 12 is a perspective view of a card storing portion of the base and the card storing portion cover and FIG. 13 is a top view of an expansion card.

Bottom surface 59 of base unit 3 has an expansion card storing portion 147. Storing portion 147 is coated by an electric conducting material. One side of storing portion 147 has connectors 151 fixed on the inner surface of base unit 3. Opposite side of storing portion 147 has a card mounting wall 153 and a stopper claws 155 for preventing an expansion card slipping. Card storing portion cover 69 has a flat metal spring 157 fixed on an inner surface of cover 69. Cover 69 is an electric conductor. An expansion card 159 has a connector 163 connected to connectors 151, expansion memories 161 and an electric conducting plate 165.

Figure 14:
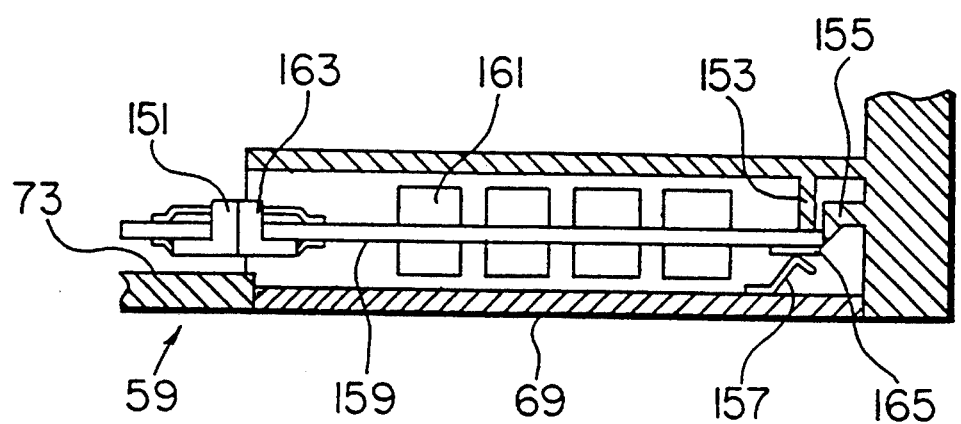
FIG. 14 is a sectional view for explaining a storing condition of the expansion card.

FIG. 14 is a sectional view for explaining a storing condition of the expansion card.

When expansion card is stored in storing portion 147 and cover 69 is fixed on bottom surface 59 by screw 71 (FIG. 15), spring 157 is contacted to conducting plate 165 and pushes card 159 on card mounting wall 153. Inner surface 73 is coated by the electric conducting material. Consequently expansion card is electrically connected to base unit 3 through plate 165, spring 157, cover 69 and screw 71 and an electromagnetic wave is prevented.

Figure 15:
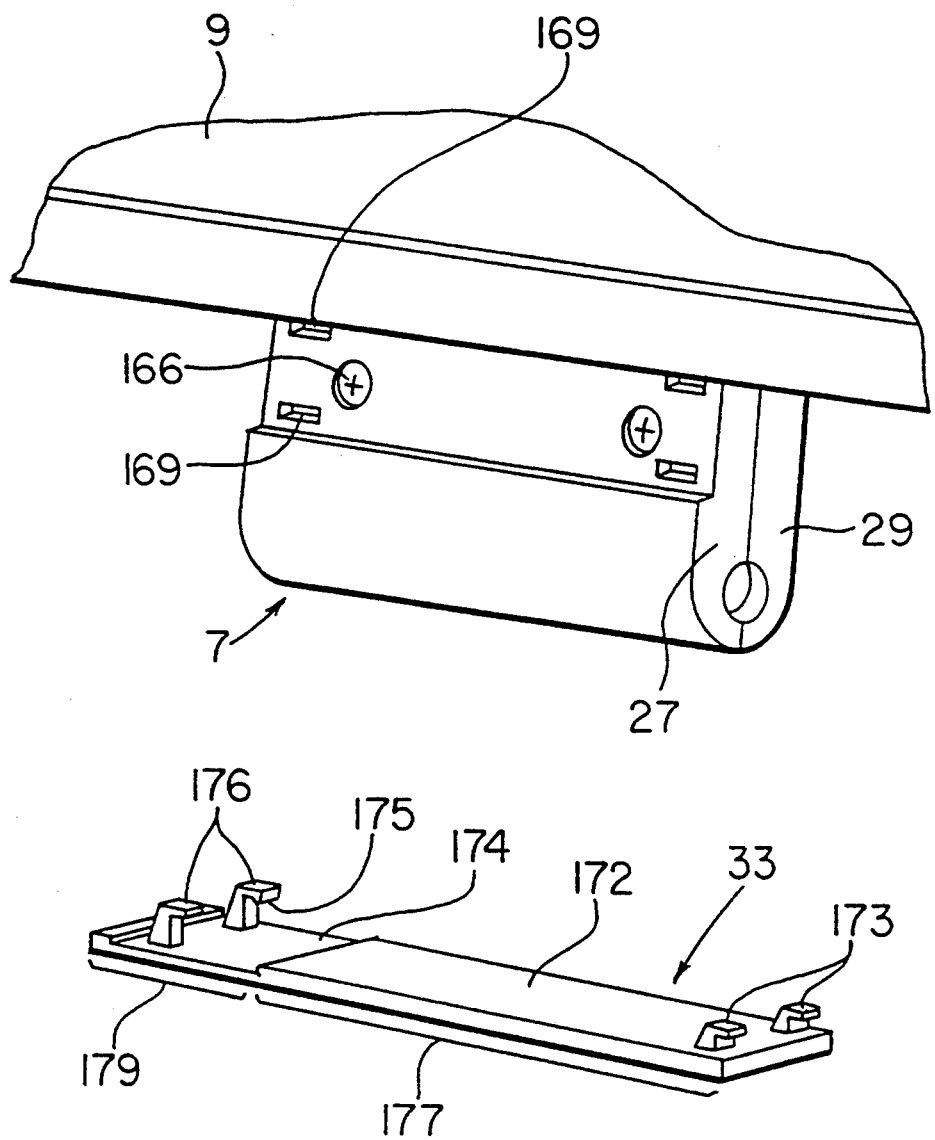
FIG. 15 is a perspective view of a display leg and a screw cover.

FIG. 15 is a perspective view of a display leg and a screw cover.

Inner cover 27 includes a cover storing portion having through holes and engaging holes 169. Outer cover 29 has screw engaging portion. Inner cover 27 and outer cover 29 are engaged by screws 166. Screw cover 33 has a thick portion 177 and a thin portion 179. An inner surface 172 of thick portion 177 has a pair of supporting claws 173. An inner surface 174 of thin portion 179 has a pair of engaging claws 178 having a engaging portion 175, respectively. Inner surface 172 is contacted with cover a surface of the cover storing portion. Inner surface 174 is not contacted with the surface.

Figure 16A:
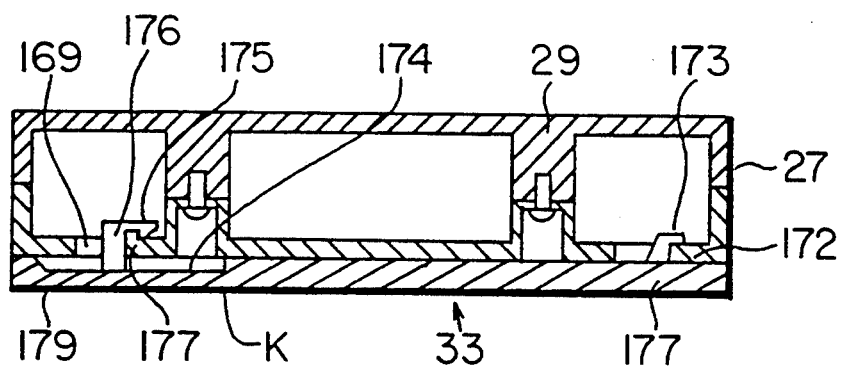
FIGS. 16A–16C are sectional views for explaining a movement of a claw of the screw cover.
Figure 16B:
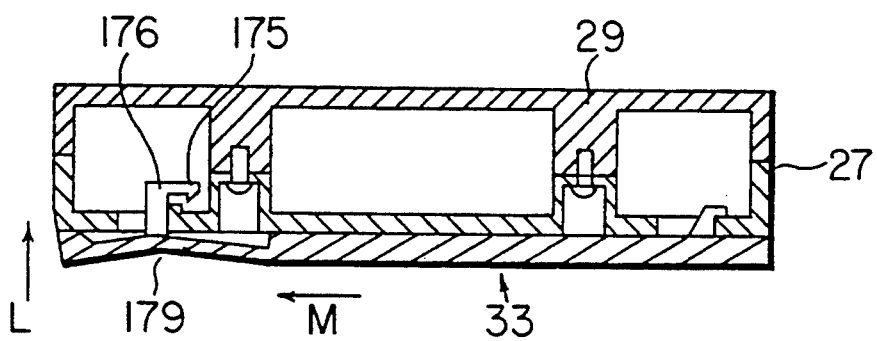
Figure 16C:
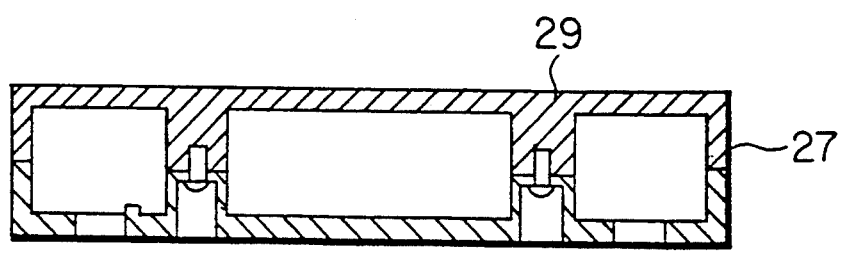
Figure 16C:
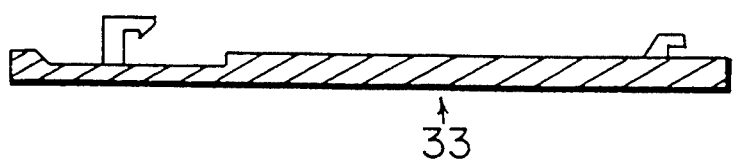

FIGS. 16A–16C are sectional views for explaining a movement of the screw cover.

When screw cover is fixed on the cover storing portion, as shown In FIG. 16A, a space K is formed between inner surface 174 and the surface of the cover storing portion. Engaging portions 175 are engaged with an inner surface of inner case 27. Supporting claws 173 are supported on the inner surface of inner case 27. When an operator pushes thin portion 179 in a direction of an arrow L, as shown in FIG. 16B, thin portion 179 is bent. When thin portion 179 is bent, engaging portions 175 is released from the inner surface of the cover storing portion. In this condition, if the operator slides cover 88 in a direction of an arrow M, cover 33 is released from Inner case 27.

What is claimed is:

1. A portable electronic apparatus comprising:
    a base unit including an inner bottom surface having a first mounting portion;
    a first disk drive including an upper drive surface and a pair of first side surfaces, the first disk drive being fixed to a drive fixing member, the drive fixing member being mounted on the first mounting portion, the drive fixing member including an inner upper surface facing the upper drive surface, an outer upper surface having a second mounting portion including at least one raised planar surface projecting from the outer upper surface, and a pair of second side surfaces, each of the second side surfaces facing one of the first side surfaces, respectively;
    a second disk drive mounted on the raised planar surface on the second mounting portion and having a size that is different than a size of the first disk drive;
    a first screw fixing the drive fixing member on the inner bottom surface; and
    a second screw fixing the second disk drive on the second mounting portion.

2. A portable electronic apparatus according to claim 1, further comprising a third screw fixing the first disk drive to the drive fixing member.

3. A portable electronic apparatus according to claim 1, wherein the first disk drive is a three and one half inch (3.5") type floppy disk drive.

4. A portable electronic apparatus according to claim 3, wherein the second disk drive is a two and one half inch (2.5") type hard disk drive.

5. A portable computer comprising:
    a base housing including a front portion having a keyboard and a rear portion having a first mounting portion and a side opening, the front portion being lower in height than the height of the rear portion;
    a fixing member fixed on the first mounting portion, the fixing member including a pair of side walls, an upper wall having a second mounting portion including at least one raised planar surface projecting from the upper wall, and a pair of side edges, each of the side edges being continuous with one of the side walls, respectively;
    a floppy disk drive fixed between the side walls, the floppy disk drive having a pair of first side surfaces, a rear surface, and a front surface having a disk loading portion, each of the first side surfaces facing one of the side walls, respectively, and the front surface having a first length; and
    a hard disk drive fixed on said planar surface on the second mounting portion, the hard disk drive having a pair of second side surfaces and a pair of third side surfaces, each of the second side surfaces having a second length approximately equal to the first length and each of the third side surfaces being shorter than the second length.

6. A portable computer according to claim 5, wherein a total of a height of the floppy disk drive and a height of the hard disk drive is approximately equal to the height of the rear portion.

7. A portable computer according to claim 5, wherein the floppy disk drive is a three and one half inch (3.5") type and the hard disk drive is a two and one half inch (2.5") type.

8. A portable computer according to claim 5, wherein each of the third side surfaces is approximately flush with one of the first side surfaces, respectively.

9. A portable computer according to claim 8, wherein one of the second side surfaces is approximately flush with the front surface.

10. A portable computer comprising:
    a base housing including a front portion having a keyboard and a rear portion having a first mounting portion and a side opening, a height of the front portion being lower than a height of the rear portion;
    a drive fixing member mounted on the first mounting portion, the drive fixing member including a pair of side walls and an upper wall having a second mounting portion and a pair of side edges, each of the side edges being continuous with one of the side walls, respectively;
    a floppy disk drive disposed between the side walls, the floppy disk drive having a pair of first side surfaces, a rear surface and a front surface having a disk loading portion, each of the first side surfaces facing one of the side walls, respectively, and the front surface having a first length;
    a hard disk drive mounted on the second mounting portion, the hard disk drive having a pair of second side surfaces and a pair of third side surfaces, each of the second side surfaces having a second length approximately equal to the first length and each of the third side surfaces being shorter than the second length;
    a first screw fixing the drive fixing member to the first mounting portion in a vertical direction;
    a second shrew fixing the floppy disk drive in the drive fixing member in a horizontal direction; and
    a third screw fixing the hard disk drive on the drive fixing member in a vertical direction.

11. A portable computer according to claim 10, wherein at least one of the side walls has a first screw hole for inserting the second screw and the upper wall has a second screw hole for inserting the third screw.

12. A portable computer according to claim 10, wherein the upper wall includes a base upper surface and a stepped surface which is higher than the base upper surface, and the second mounting portion is disposed in the stepped surface.

13. A portable computer comprising:
    a base unit including an inner bottom surface having a first mounting portion;
    a device fixing member being mounted on the first mounting portion, the device fixing member including an inner upper surface, an outer upper surface having a second mounting portion including at least one raised planar surface projecting from the outer upper surface, and a pair of first side surfaces;
    a first memory device being fixed to the device fixing member, the first memory device including an upper device surface facing the inner upper surface and a pair of second side surfaces, each of the second side surfaces facing one of the first side surfaces, respectively;

a second memory device being mounted on the second mounting portion;

a first screw fixing the device fixing member on the inner bottom surface; and a second screw fixing the second memory device on said planar surface on the second mounting portion.

14. A portable computer according to claim 13, wherein the first memory device is a floppy disk drive, and the second memory device is a hard disk drive.

15. A portable computer comprising:

a base unit including an inner surface having a first mounting portion;

a device fixing member being mounted on the first mounting portion, the device fixing member including an upper wall having a second mounting portion with at least one raised planar surface projecting from the upper wall, and a pair of side walls;

a first memory device including an upper surface facing the upper wall, the first memory device fixed between the side walls;

a second memory device being mounted on said planar surface on the second mounting portion;

a first screw fixing the device fixing member on the first mounting portion; and a second screw fixing the second memory device on the second mounting portion.

16. A portable computer according to claim 15, wherein the upper wall includes an inner upper surface facing the upper surface and an outer upper surface having the second mounting portion.

17. A portable computer according to claim 16, wherein the first memory device is a floppy disk drive, and the second memory device is a hard disk drive.

* * * * *